US005570324A

United States Patent [19]
Geil

[11] Patent Number: 5,570,324
[45] Date of Patent: Oct. 29, 1996

[54] UNDERWATER SOUND LOCALIZATION SYSTEM

[75] Inventor: Frederick G. Geil, Annapolis, Md.

[73] Assignee: Northrop Grumman Corporation, Los Angeles, Calif.

[21] Appl. No.: 523,968

[22] Filed: Sep. 6, 1995

[51] Int. Cl.⁶ ..................................................... G01S 3/80
[52] U.S. Cl. ........................... 367/124; 367/118; 367/120; 367/129
[58] Field of Search ................................... 367/118, 120, 367/124, 127, 131

[56] References Cited

U.S. PATENT DOCUMENTS

| | | |
|---|---|---|
| 3,592,967 | 7/1971 | Harris ....................................... 367/180 |
| 3,715,577 | 2/1973 | Bohman ................................... 367/124 |
| 4,833,659 | 5/1989 | Geil et al. ............................... 367/155 |
| 4,933,919 | 6/1990 | Geil et al. ............................... 367/159 |

OTHER PUBLICATIONS

"Hydrophone Techniques for Underwater Sound Pickup", Audio Engineering Society, 60 East 42nd St., NY, NY 10165, presented at 91st Convention 1991 Oct. 4–8, New York by Fred G. Geil, Westinghouse Oceanic Division, Annapolis, MD.

Primary Examiner—Ian J. Lobo
Attorney, Agent, or Firm—Philip A. Florenzo

[57] ABSTRACT

A control system connected to a passive underwater transducer array is located remotely from the array, e.g. above the surface of the water, to localize an underwater source of acoustic energy in a relatively simple manner by introducing listener-motion, such as head turning or body motion of a listener, into the sound localization process and does so without any underwater mechanical linkage of any kind. This is achieved by a pair of listener-motion coupled potentiometers, referred to as mixing-pots, located at the site of the listener, being connected to the outputs of an array of passive acoustic transducers, with the two outputs of the mixing-pots being coupled to a pair of headphones worn by the listener.

25 Claims, 3 Drawing Sheets

UNDERWATER SOUND LOCALIZATION SYSTEM

BACKGROUND OF THE INVENTION

1. Field of the Invention

This invention relates generally to underwater detection of acoustic signals and more particularly to a system for determining the direction from which the acoustic signals emanate.

2. Description of the Prior Art

It is often useful to detect acoustic energy, such as sounds, underwater and determine by ear the direction from which they emanate. For example, it would be advantageous when capturing biological pictures and sounds to be able to guide a vehicle silently towards the sound's source. Moreover, it would be desirable to localize these sounds without trial and error meandering. Another example where the localization of sounds underwater would be useful is the guidance of a rescue vehicle or camera to a second vessel in murky water by homing in or the sound of a distress beacon located on the vessel.

For a human, such as a diver, localizing the sounds underwater is difficult, if not impossible, because unaided humans do not hear accurately at all in water. This is due to the fact that wavelengths are longer since sound travels faster in water than in air and as a result reduces the effective separation or aperture of the listener's ears. Furthermore, the ears are reduced in sensitivity and sound via bone conduction in water forces sounds to be monaural unless the sound is very close to one ear.

On the other hand, for a listener in an air environment, e.g. on a vessel on the surface of the water, using a stationary array of standard omnidirectional hydrophones results in a front to rear ambiguity of direction. Also, a listener's pinnae in the ears are not utilized to determine direction, and thus the underwater sound field must be recreated locally, for example, at the site of the listener.

For airborne sound, as opposed to sound in water, the most accurate localization is achieved by the human brain, utilizing the slight time difference or phase between the signals received by the two ears of the listener and the smearing-in-time processing done by the pinnae of the ears. This time processing is a function of the azimuth angle to the source. It is important to note that there is also a difference between front and rear sounds. Thus when sounds are picked up by microphone pairs, it is important to apply the separate acoustic signals to the ears separately, normally by means of a pair of headphones. Such an arrangement avoids acoustic crosstalk. Accordingly, phase matching between the microphones is important as well as for the earphone pair. If the microphone pair comprises omnidirectional microphones, there is no signal difference between front and rear sounds and the front-rear ambiguity immediately becomes evident to the listener. In absence of any additional cues, such as sight or head motion, all sounds will be localized to the rear hemisphere of the listener's head.

Some types of microphone arrays can alleviate this problem, such as the Office de Radio Diffusion-Television Francaise (ORTF) cardioid array or a Stereo Ambient Sampling System (SASS) configuration, both well known, which can at least favor, because of microphone directivity, forward sounds. However, the arrangement which comes closest to eliminating the front-rear ambiguity would be a "dummy head" with microphones in its ears, which are replicas of the listener's own pinnae. It is also necessary to include part of the torso with the dummy head and to provide electronic filtering tailored to each listener.

Thus for airborne sound localization accuracy, it is seldom achieved without sight cues or head motion. In any event, a dummy head with replica pinnae is not a practical solution for underwater applications. Even if it were, the head size would have to be 4.5 times larger inasmuch as all dimensions must be scaled up by a factor of 4.5 due to the increased speed of sound in water, which is approximately 5000 ft./sec. as opposed to 1087 ft./sec. in air.

SUMMARY

Accordingly, it is an object of the present invention to provide a means for localizing the source of underwater acoustic signals.

It is a further object of the invention to utilize motion of the listener in an underwater sound localization system.

It is yet a further object of the invention to resolve the direction from which underwater acoustic signals are coming from by electronically implementing the motion, such as head turning, of the listener to an underwater hydrophone array without mechanically coupling the head of the listener to the hydrophone array.

These and other objects are achieved by an underwater transducer array which enables "virtual reality" to be realized underwater in a relatively simple manner while introducing the important factor of listener-motion, which is head turning, into the underwater sound localization process and does so without any underwater linkage of hydrophone motion of any kind. This is achieved by listener-motion coupled potentiometers connected to the outputs of an array of passive acoustic transducers and whose output terminals are coupled to the headphones of a listener located remotely from the transducer array.

The apparatus employed is comprised of an array of at least four first type transducer means for converting acoustic signals to corresponding electrical signals, the first type transducers being utilized in sets of at least two transducers each and being mutually separated laterally by a first fixed distance, each set of the first type transducers comprising at least a front transducer and a rear transducer and separated by a second fixed distance, the front and rear transducers of both sets of first type transducers having respective amplifiers with low output impedances connected to the output terminals thereof and generating electrical output signals corresponding to the acoustic signal sensed thereby and emanating from the source being sensed; first potentiometer means coupled across the output terminals of one set of the first type transducers and having a first movable output terminal; second potentiometer means coupled across the output terminals of the other set of the first type transducers and having a second movable output terminal; means responsive to the motion of an acoustic sensor, typically a human listener, remote from the array of first type transducers and being coupled to and moving the first and second movable output terminals of the potentiometer means in mutually opposite directions; and second type transducer means coupled to the output terminals of the first and second potentiometer means for converting electrical signals to corresponding acoustic signals located in proximity to the acoustic sensor, whereby the motion of the acoustic sensor varies the settings of the potentiometer means, causing phase mixing of the respective output signals from the front and rear transducers for both sets of the first type transducers to provide an indication of the location of the source of the sound relative to the array by utilizing the time difference between arrival of the acoustic signals at both sets of first type transducers.

In a specific embodiment of the invention, apparatus for localizing a source of underwater acoustic signals from a remote location comprises: a passive array of hydrophones for converting acoustic signals to corresponding electrical signals, the array of hydrophones consisting of two sets of low output impedance hydrophones separated laterally by a first fixed distance, each set of hydrophones further comprising at least a front hydrophone and a rear hydrophone separated by a second fixed distance, the front and rear hydrophones of both sets of hydrophones having respective output signal taps and generating electrical output signal corresponding to the acoustic signal sensed thereby and emanating from the source; a first potentiometer coupled across the outputs of one set of said hydrophones and having a first movable output signal tap; a second potentiometer coupled across the outputs of the other set of the hydrophones and having a second movable output signal tap; means responsive to the turning motion e.g. head of a listener remote from the source and being coupled to and moving the first and second output signal taps of the potentiometers in mutually opposite directions; and a pair of hydrophones adapted to be worn by the listener and being coupled to the output signal taps of the first and second potentiometers for converting electrical signals to corresponding acoustic signals emanating from the source and coupling the acoustic signals to the ears of the listener; whereby the direction from which acoustic signals impinge on the array of hydrophones is resolved by the turning motion of the listener varying the position of the output signal taps of the first and second potentiometers.

BRIEF DESCRIPTION OF THE DRAWINGS

The following detailed description of the invention will be more readily understood when considered together with the accompanying drawings wherein.

DETAILED OF THE PREFERRED EMBODIMENTS

Figure 1:
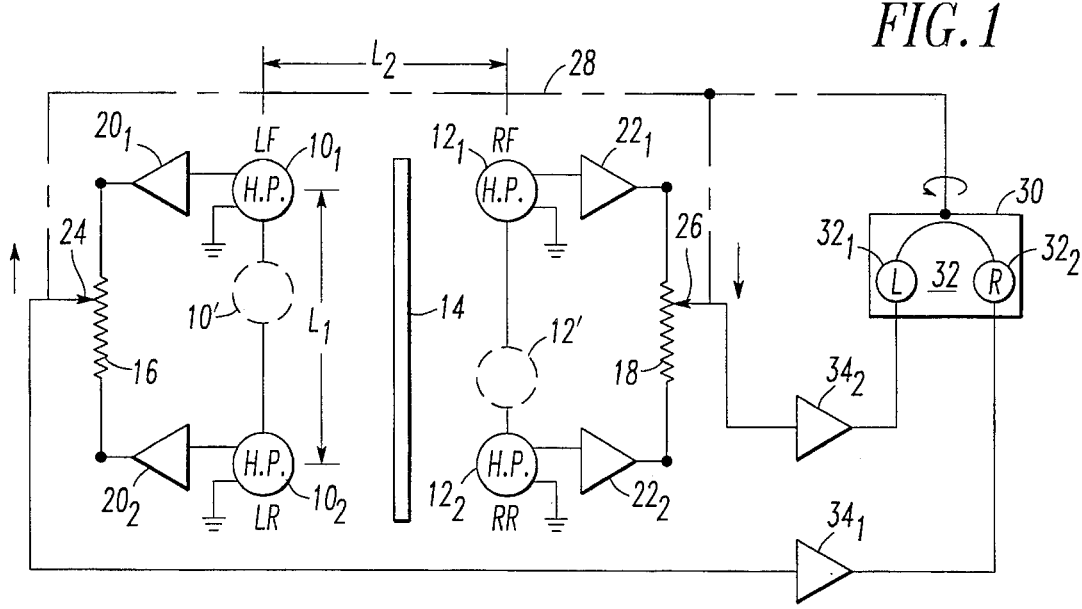
FIG. 1 is an electrical schematic diagram of a first embodiment of the invention.

Referring now to the drawings wherein like reference numerals refer to like parts throughout, and more particularly to FIG. 1, shown thereat is a passive acoustic transducer array for sensing an underwater source 6 of acoustic energy 8 (FIG. 2) and comprised of two pairs of hydrophones 10 and 12, along with their associated amplifiers $20_1$, $20_2$ and $22_1$, $22_2$ and more particularly a left-front (LF) hydrophone $10_1$ and a left-rear (LR) hydrophone $10_2$ separated by a distance $L_1$ and a right-front (RF) hydrophone $12_1$ and a right-rear (RR) hydrophone 122 also separated by the distance $L_1$. The right and left pairs of hydrophones 10 and 12, moreover, are separated by a distance $L_2$. A typical hydrophone is shown and described in U.S. Pat. No. 4,933, 919 issued to F. G. Geil et al on Jun. 12, 1990.

The distances $L_1$ and $L_2$ are shown in FIG. 1 as being substantially equal and comprises a distance which is less than ½λ where λ is the highest frequency of interest which for a 1 kHz acoustic signal, is approximately 2 ft. or 24 in. Such a separation corresponds to the dimensions of a typical human head multiplied by a factor of 4.5 for water immersion. Also as shown in FIG. 1, a baffle 14 is located between the left and right pairs of hydrophones 10 and 12. The baffle 14 is intended to simulate the bone portion of a listener's skull as it relates to causing delays in sounds reaching the ears from opposite sides of the head. The baffle 14, however, is not essential to this invention and can be omitted when desirable.

A pair of potentiometers 16 and 18 are respectively coupled across the outputs of the left and right pairs of hydrophones $10_1$, $10_2$, and $12_1$, $12_2$. The potentiometers 16 and 18 comprise "mixing pots" for establishing a virtual source 10' located between the two hydrophones $10_1$ and $10_2$ on the left and a vertical source 12' located between the two hydrophones $12_1$ and $12_2$ on the right, with the two vertical sources 10' and 12' being delivered to left and right ears, respectively, of a listener 30. As shown, one end of the mixing-pot 16 is coupled to the output of the left-front (LF) hydrophone $10_1$ by a low output impedance pre-amplifier/ amplifier or simply pre-amp $20_1$. The other end of the potentiometer 16 is coupled to the output of the left-rear (LR) hydrophone $10_2$ by means of a second low output impedance pre-amp $20_2$. In a like manner, the output of a right-front (RF) hydrophone $12_1$ is connected to one end of the mixing-pot 18 by means of a low output impedance pre-amp $22_1$, while its opposite end is coupled to the output of the right-rear hydrophone $12_2$ by means of low output impedance pre-amp $22_2$.

The sliders i.e. output terminals 24 and 26 of the mixing-pots 16 and 18 are caused to move in mutually opposite directions in response to movement of a listener 30, for example, rotation of the listener's head. This is provided by a mechanical coupling, shown schematically by reference numeral 28, to the listener 30. The output terminals 24 and 26 of the mixing-pots 16 and 18 are furthermore electrically connected to the left and right ear pieces $32_1$ and $32_2$ of a pair of headphones 32 by means of a pair of amplifiers $34_1$ and $34_2$.

The output impedance of the hydrophones 101, 102 and $12_1$, $12_2$, moreover, is low relative to the resistance of the mixing pots 16 and 18 so that when a pot is directly coupled to one hydrophone, the other hydrophone signal is effectively shorted out. At less extreme positions, the percentage of each hydrophone's signal contribution to the virtual hydrophone's phase-mixed signal is determined by the voltage divider action of the mixing pots 16 and 18.

In the assembly shown in FIG. 1, only the hydrophones 10 and 12 are located underwater. The remaining elements are located in the listener's environment which may be, for example, in a craft or vessel 36 (FIG. 2), remote from the hydrophone array.

In the configuration of FIG. 1, the mixing-pots 16 and 18 are ganged together and controlled by the listener's 10 head movement such that at one extreme the left-front (LF) and right-rear (RR) hydrophones $10_1$ and $12_2$ are utilized 100%, while the other two hydrophones (LR and RF) $10_2$ and $12_1$ is 0. This condition corresponds to the listener's head being turned 45° to the right. If the mixing-pots 16 and 18 are moved to the opposite extreme, the left-rear (LR) and right-forward (RF) hydrophones $10_2$ and $12_1$ are utilized 100° and corresponds to the listener's head being turned 45° to the left. As noted above, the mixing-pots 16 and 18 are located in the listener's environment such that as the listener's head is turned, the pots 16 and 18 are actuated, since their shafts are mechanically attached to the listener's headphone assembly. If standard 330 degree pots are employed, a rotational step-up is employed, equivalent to a 3.7:1 gear ratio. When the listener's head is centered (0°), all four hydrophone signals are utilized the same level of 50% each. In this condition, a "virtual" hydrophone 10' and 12' appears midway between the hydrophone pairs $10_1$, $10_2$ and $12_1$, $12_2$. Each new head position creates new positions for the virtual hydrophones 10' and 12'.

It should be pointed out that an important feature of the embodiment shown in FIG. 1 is that outputs of the left and right hydrophone pairs $10_1$, $10_2$ and $12_1$ and $12_2$ are phase mixed and not amplitude mixed. However, phase mixing has its limitations and the distance between the hydrophone pair being mixed should be less than ½λ as noted above. When the spacing equals ½λ, the signal is equal and opposite in each of the hydrophones and is cancelled. This requires that the left-front (LF) and left-rear (LR) spacing $L_1$ be, for example, no greater than 2.5 feet for a pure 1 kHz signal. While a four hydrophone geometry with 2 ft. separation as described violates the ½λ principle in theory for higher frequencies, in practice the spacing is satisfactory since real sounds are not pure tones but a collection of may frequencies. Nevertheless, this theoratical frequency limitation is addressed below in an alternate embodiment.

Figure 2:
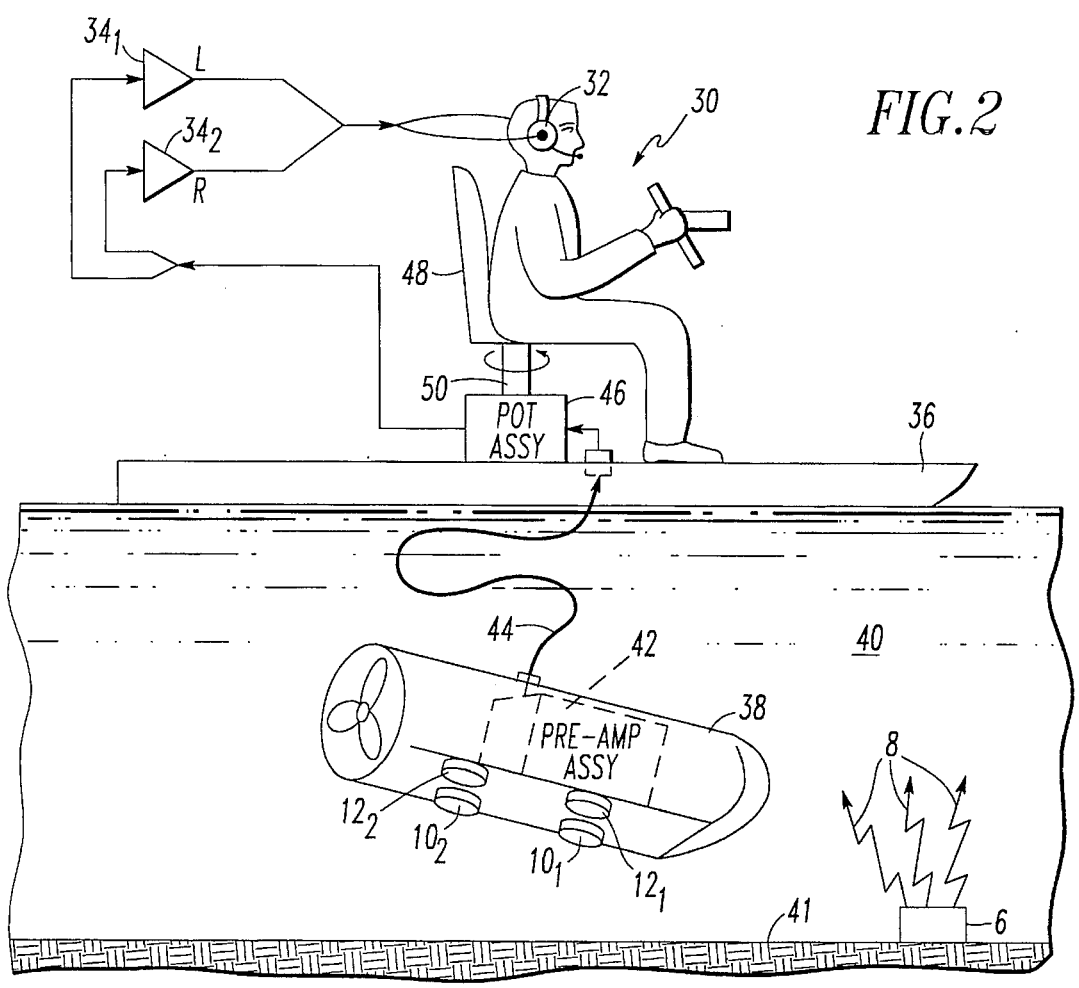
FIG. 2 is an electro-mechanical schematic diagram illustrative of an application for the embodiment shown in FIG. 1.

Referring now to FIG. 2, shown thereat is an embodiment whereby the listener 30 is located, for example, on a surface vehicle 36, such as a ship, and there is a need to control a remotely operated vehicle (ROV) 38 navigating in a self-propelled mode underwater as shown by reference numeral 40. The two sets of hydrophones $10_1$, $10_2$ and $12_1$ and $12_2$ are located in a quad pattern on the underside of the ROV 38 and are electrically coupled to a pre-amp assembly 42 located in the ROV 38. The pre-amp assembly 42 is coupled to a potentiometer assembly 46 in the surface vehicle 36 by an umbilical cable 44. The pre-amp assembly 42 houses the pre-amps $20_1$, $20_2$, and $22_1$ and $22_2$ shown in FIG. 1 while the potentiometer assembly 46 contains the mixing pots 16 and 18.

In the embodiment shown in FIG. 2, the potentiometer assembly 46 is located beneath a swivel type seat 48 whose post 50 and is integral with and activates the potentiometer assembly 46 which also acts as a base for the seat 48. In this embodiment, movement of the listener 30 in azimuth causes the seat to rotate and thus actuate the setting of the mixing-pots 16 and 18 instead of the listener 30 simply turning his head from left to right as taught in FIG. 1.

In operation, the operator or listener 30 would be facing straight ahead in the swivel chair 48. This corresponds to the direction of travel of the ROV 38 and where the virtual hydrophones 10' and 12' (FIG. 1) would be midway between the left-front (LF) and left-rear (LR) hydrophones 101 and 102 as well as the right-front (RF) and right-rear (RR) hydrophones $12_1$ and $12_2$, since the seat's 0° orientation provides a mixing-pot setting at mid-position. Now assuming a sound 8 of interest from the source 6 impinges from the northeast (NE) at a 45° angle. Before swiveling, the operator 30 cannot tell whether the sound 8 is coming from 45° or 135° which is to the southeast (SE) because of the phase ambiguity. However, by swiveling, the ambiguity can be resolved, since when the operator 30 rotates to the right, the sound 8 will appear to be less offset. If the true direction was 135°, it would have appeared even more offset. If the operator completely swivels to 45°, the mixing-pots are in the extreme position, but the sound 8 will be centered and the ROV 38 can then be instructed to steer 45° to the starboard.

While the embodiments shown in FIGS. 1 and 2 disclose a four hydrophone array, another arrangement is disclosed whereby a rotation range can be enhanced by the use of an array of a hydrophone array comprised of more than just four hydrophones $10_1$, $10_2$ and $12_1$ and $12_2$. In the embodiment shown in FIG. 3, a plurality n of hydrophones $10_1$, $10_2$, $10_3$ ... $10_{n-1}$, $10_n$ are utilized with multi-tapped potentiometers 16' and 18'. All the hydrophone signals of the left and right sets of hydrophones $20_1$ ... $20_n$, and $12_1$ ... $12_n$ respectively couple to the multi-tapped mixing-pots 16' and 18'.

Each virtual hydrophone 10' and 12' is panned smoothly from left-front (LF) to left-rear (LR) and right-front (RF) to right-rear (RR) without ½, λ cancellations because no more than two hydrophones at a time, for example, hydrophones $20_2$ and $20_3$ can contribute to generating a "virtual" signal. Contributions from the other hydrophones $20_1$, $20_{n-1}$, $20_n$ are prevented by the low output impedance of each of its respective preamplifiers $20_1$, $20_2$ ... $20_n$. Furthermore, the separation of $L_3$ between the two sets of hydrophones 10 and 12 can be much smaller than the distance $L_2$ in FIG. 1.

Figure 3:
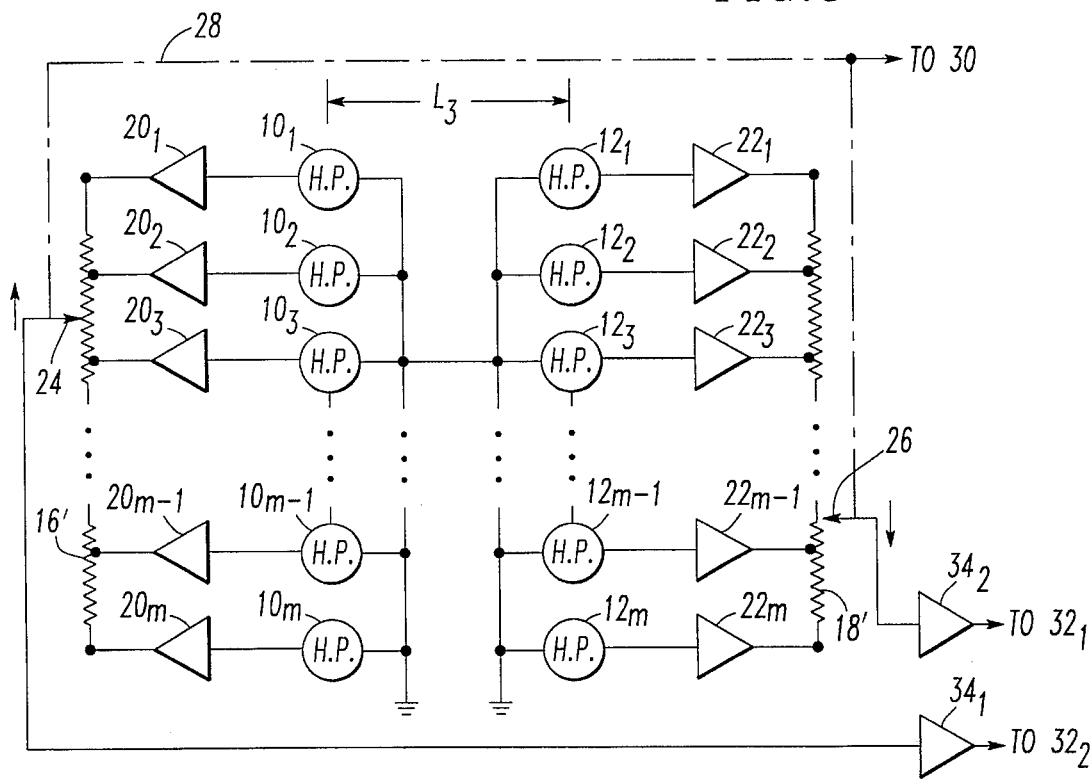
FIG. 3 is an electrical schematic diagram illustrative of a second embodiment of the subject invention and comprised of more than two hydrophones in the two sets of hydrophones shown in FIG. 1.
Figure 4:
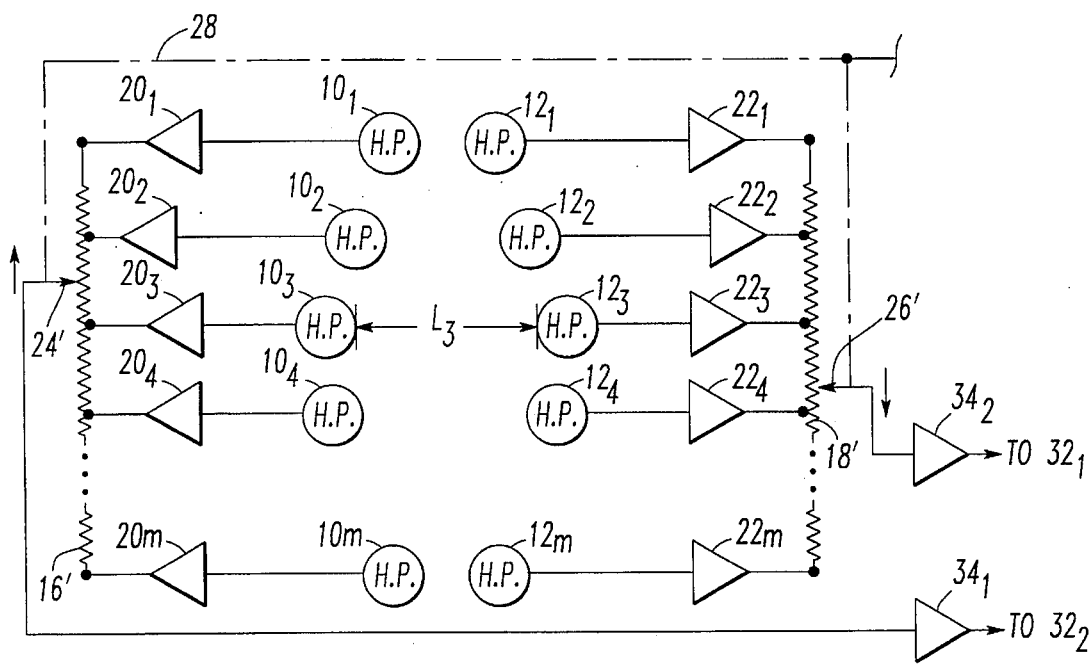
FIG. 4 is an electrical schematic diagram of a third embodiment of the invention and being a variation of the embodiment shown in FIG. 2 wherein the hydrophones are arranged in two arcuate sets of hydrophones.

A variation of the embodiment disclosed in FIG. 3 is shown in FIG. 4 and simply comprises arranging the two sets of headphones $10_1$, $10_2$ ... $10_n$ and $12_1$, $12_2$ ... $12_n$ in a circular configuration which would provide an even more precise and accurate system of localization than in the linear configurations described heretofore.

It is conceivable that the two sets of hydrophones $10_1$ ... $10_n$ and $12_1$ ... $12_n$ could be placed on the bottom 41 (FIG. 2) in a stationary array.

Figure 5A:
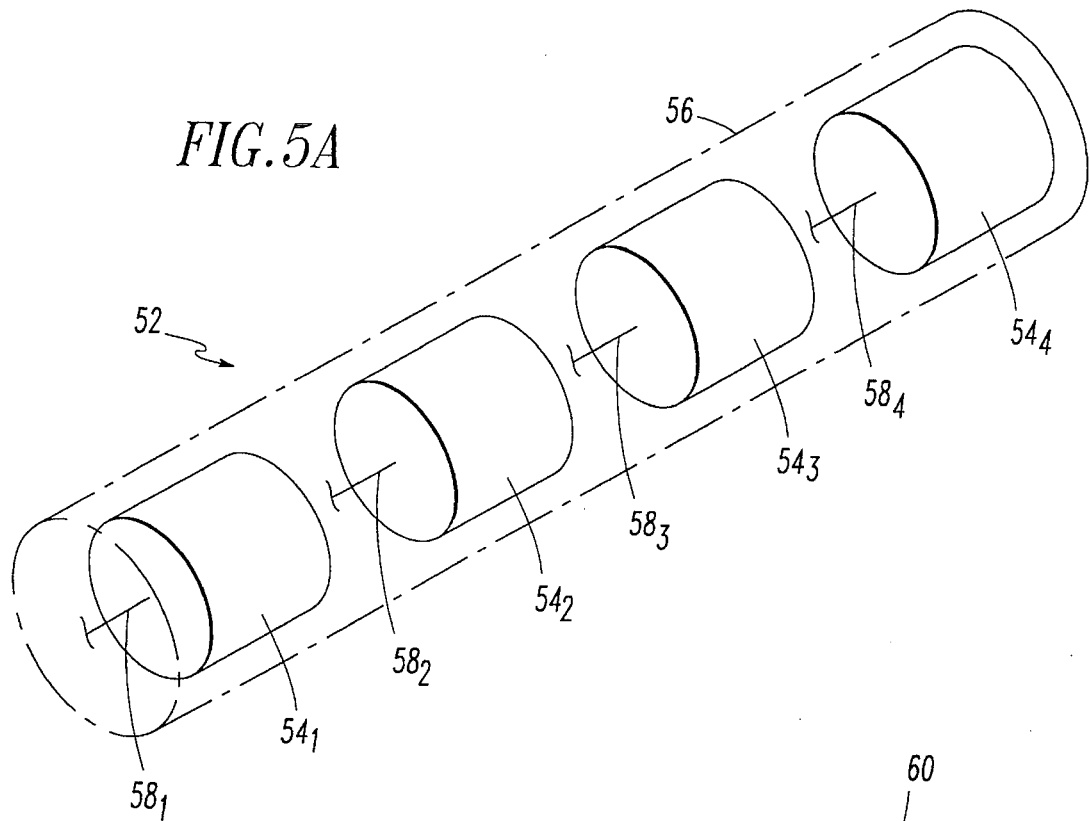
FIG. 5A is a partial perspective view of a first type of continuous line hydrophone array.
Figure 5B:
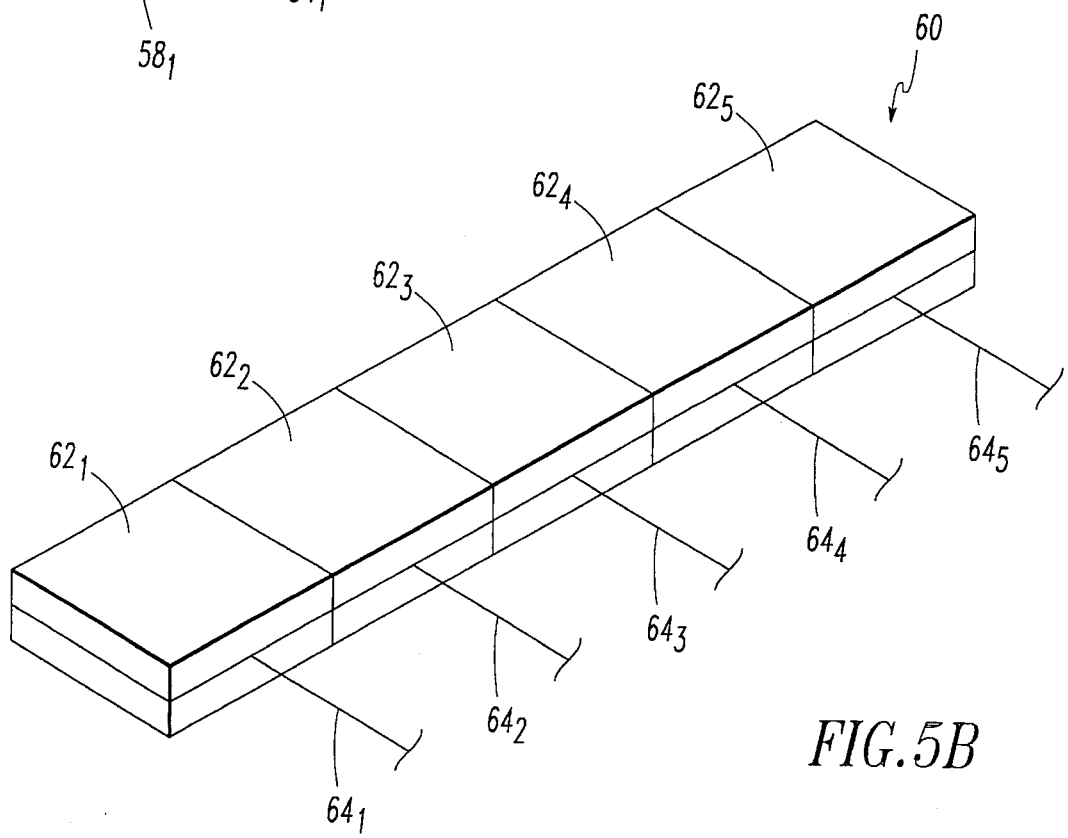
FIG. 5B is a perspective view of another type of continuous line hydrophone array.

Referring now briefly to FIGS. 5A and 5B, shown thereat are two different types of linear hydrophone arrays. In FIG. 5A, a linear hydrophone array 52 is shown comprised of a plurality of discrete cylindrical passive hydrophone elements $54_1$, $54_2$, $54_3$, $54_4$, which are housed in a cylindrical casing 56 and which is adapted to conduct acoustic energy therethrough to the individual hydrophone elements $54_1$, $54_2$, etc. Each of the hydrophones $54_1$, $54_2$, $54_3$ and $54_4$ have individual output leads $58_1$, $58_2$, $58_3$ and $58_4$ which can be arranged in a wiring harness, not shown, so as to be fed out of one end of the casing 56 to respective signal amplifiers such as shown in FIGS. 1–4.

The embodiment shown in FIG. 5B, on the other hand, discloses a linear hydrophone array 60 comprised of a plurality of contiguous passive hydrophone elements $62_1$, $62_2$ ... $62_4$, etc. comprised of segmented strips of piezo-rubber material. An example of this type of device is shown and described in U.S. Pat. No. 4,833,659, which issued to F. G. Geil et al on May 23, 1989. As before, each hydrophone $62_1$, $62_2$, etc. includes a respective output lead $64_1$, $64_2$ ... $64_5$, etc. which is adapted to be coupled to a respective amplifier, not shown.

Thus what has been shown and described is a passive hydrophone arrangement whereby "virtual reality" may be implemented effectively in an underwater environment for the localization of sound sources remote from the listener and which permits the localization of the source to control the movement of an underwater vehicle.

Having thus disclosed what is at present considered to be the preferred embodiments of the invention, it should be noted that the same has been made by way of explanation and not limitation. Therefore, all modifications, alterations and changes coming within the spirit and scope of the invention as defined by the appended claims are herein meant to be included.

I claim:

1. Apparatus for localizing a source of acoustic signals, comprising:

an array of first type transducer means for converting acoustic signals to corresponding electrical signals, said array of first type transducer means comprising two sets of at least two transducers each and mutually separated laterally by a first fixed distance, each set of said first type transducers comprising at least a front transducer and a rear transducer and separated by a second fixed distance, said front and rear transducers of both sets of first type transducers having relatively low impedance output terminals and generating electrical output signals corresponding to the acoustic signals sensed thereby and emanating from said source;

first potentiometer means coupled across the output terminals of one set of said first type transducers and having a first movable output terminal;

second potentiometer means coupled across the output terminals of the other set of said first type transducers and having a second movable output terminal;

means responsive to the motion of an acoustic sensor remote from said array of first type transducers and being coupled to and moving said first and second movable output terminals of said first and second potentiometer means in mutually opposite directions; and second type transducer means coupled to the output terminals of said first and second potentiometer means for converting electrical signals to corresponding acoustic signals located in proximity to said acoustic sensor;

whereby the motion of the acoustic sensor varies the settings of said potentiometer means, causing phase mixing of the respective output signals from the front and rear transducers of both sets of said first type transducers to provide an indication of the location of the source of the sounds relative to the array by utilizing the time difference between the arrival of said acoustic signals at both sets of said first type transducer means.

2. The apparatus according to claim 1 wherein said array of first type transducer means are located in a first environment and the acoustic sensor as well as the second type transducer means are located in a second environment.

3. The apparatus according to claim 2 wherein said first environment comprises water and the second type environment comprises air.

4. The apparatus according to claim 3 wherein said first type transducer means are comprised of relatively low output impedance acoustic transducers and said second type transducer means are comprised of a pair of speaker elements.

5. The apparatus according to claim 3 wherein said first type transducer means comprises underwater hydrophones and said second type transducer means comprises speaker means.

6. The apparatus according to claim 5 wherein said acoustic sensor comprises the head of a listener and said speaker means comprises a pair of headphones located on the head of the listener.

7. The apparatus according to claim 6 wherein said means responsive to the motion of said acoustic sensor comprises means responsive to head motion of the listener.

8. The apparatus according to claim 6 wherein said means responsive to the motion of said acoustic sensor comprises means responsive to a turning motion of the listener.

9. The apparatus according to claim 8 wherein said first and second fixed distances of said first type transducers simulate hearing response of a human head.

10. The apparatus according to claim 9 and additionally including a baffle between said two sets of first type transducers to simulate the delay caused by the bone of the skull of acoustic signals from said source arriving at the ears of a listener.

11. The apparatus according to claim 9 wherein the second fixed distance is equal to or less than ½λ where λ is the wavelength of the highest frequency of interest emanating from said source.

12. The apparatus according to claim 11 wherein the first fixed distance is also equal to or less than ½λ.

13. The apparatus according to claim 12 where λ is about 4.5 ft. and corresponds to a highest frequency of interest of 1 KHz.

14. The apparatus according to claim 9 wherein said array is located on an underwater vehicle.

15. The apparatus according to claim 14 wherein the listener is located on a vehicle on or above the surface of the water.

16. The apparatus according to claim 1 wherein said array comprises two aligned sets of first type transducers.

17. The apparatus according to claim 16 wherein each said set of first type transducers comprises a number of transducers greater than two.

18. The apparatus according to claim 1 wherein said array comprises two arcuate sets of first type transducers numbering greater than two transducers each.

19. Apparatus for localizing a source of underwater acoustic signals from a remote location, comprising:

a passive array of hydrophones located on an underwater vehicle for converting acoustic signals to corresponding electrical signals, said array of hydrophones comprising two sets of hydrophones separated laterally by a first fixed distance, each said set of hydrophones further comprising at least a front hydrophone and a rear hydrophone separated by a second fixed distance, said front and rear hydrophones of both sets of hydrophones having respective outputs and generating electrical output signals corresponding to the acoustic signals sensed thereby and emanating from said source;

a first potentiometer coupled across the outputs of one set of said hydrophones and having a first movable output signal tap;

a second potentiometer coupled across the outputs of the other set of said hydrophones and having a second movable output signal tap;

means responsive to at least the turning motion of a listener's ahead remote from said underwater vehicle and being coupled to and moving said first and second movable output signal taps of said potentiometers in mutually opposite directions; and a pair of headphones adapted to be worn by the listener and being coupled to the output signal taps of said first and second potentiometers for converting electrical signals to corresponding acoustic signals emanating from said source and coupling said acoustic signals to the ears of the listener;

whereby the direction from which acoustic signals impinge on the array of hydrophones is resolved by the turning motion of at least the listener's head varying the position of the output signal taps of said first and second potentiometers.

20. The apparatus according to claim 19 wherein the listener is located on a surface vehicle.

21. The apparatus according to claim 20 wherein the underwater vehicle comprises a remotely controlled underwater vehicle.

22. The apparatus according to claim 21 wherein the remotely controlled underwater vehicle is controlled in response to the turning motion of the listener on said surface vehicle.

23. The apparatus according to claim 22 wherein the remotely controlled underwater vehicle is controlled in response to the head turning motion of the listener.

24. The apparatus according to claim 22 wherein the remotely controlled underwater vehicle is controlled in response to a rotatable seat assembly on said surface vehicle, said seat assembly being coupled to and actuating the first and second movable output signal taps of said potentiometers as a seat of said assembly is turned in azimuth by a listener on said seat.

25. The apparatus according to claim 22 wherein said two sets of hydrophones are spaced apart so as to replicate the hearing response of the head of a listener.

* * * * *